United States Patent
Morinaga et al.

(12)

(10) Patent No.: US 11,886,086 B2
(45) Date of Patent: Jan. 30, 2024

(54) LIGHT CONTROL SHEET

(71) Applicant: TOPPAN Inc., Taito-ku (JP)

(72) Inventors: Kaori Morinaga, Taito-ku (JP); Taisuke Enya, Taito-ku (JP); Yuji Yano, Taito-ku (JP); Masayuki Takahashi, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 0 days.

(21) Appl. No.: 18/308,084

(22) Filed: Apr. 27, 2023

(65) Prior Publication Data

US 2023/0266629 A1   Aug. 24, 2023

Related U.S. Application Data

(63) Continuation of application No. PCT/JP2021/039979, filed on Oct. 29, 2021.

(30) Foreign Application Priority Data

Oct. 30, 2020 (JP) .................................. 2020-182450

(51) Int. Cl.
*G02F 1/1334* (2006.01)
*G02F 1/137* (2006.01)
*G02F 1/1337* (2006.01)
*G02F 1/1343* (2006.01)

(52) U.S. Cl.
CPC ............ *G02F 1/137* (2013.01); *G02F 1/1334* (2013.01); *G02F 1/1337* (2013.01); *G02F 1/13439* (2013.01); *G02F 2203/48* (2013.01)

(58) Field of Classification Search
CPC .. G02F 1/1337; G02F 1/13439; G02F 1/1334; G02F 1/13347
See application file for complete search history.

(56) References Cited

U.S. PATENT DOCUMENTS

2019/0227354 A1*   7/2019   Hayashida .......... G02F 1/13476

FOREIGN PATENT DOCUMENTS

JP             2019-194654 A      11/2019

OTHER PUBLICATIONS

International Search Report dated Jan. 18, 2022 in International Application No. PCT/JP2021/039979 filed Oct. 29, 2021 , 6 pages (with English Translation).

* cited by examiner

*Primary Examiner* — James A Dudek
(74) *Attorney, Agent, or Firm* — Oblon, McClelland, Maier & Neustadt, L.L.P.

(57) ABSTRACT

A light control sheet including a first transparent electrode layer, a second transparent electrode layer, a light control layer including a resin layer formed between the first transparent electrode layer and the second transparent electrode layer, the resin layer including voids dispersed therein and filled with a liquid crystal composition including liquid crystal molecules, and a first orientation layer formed between the first transparent electrode layer and the light control layer such that a haze of the light control layer is increased by applying a voltage to the first transparent electrode layer. The light control layer has a first surface in contact with the first orientation layer, and an area ratio of the voids at the first surface is 49% or more where the area ratio is a percentage of a total area of all the voids to an area of the first surface.

11 Claims, 3 Drawing Sheets

LIGHT CONTROL SHEET

CROSS-REFERENCE TO RELATED APPLICATIONS

The present application is a continuation of International Application No. PCT/JP2021/039979, filed Oct. 29, 2021, which is based upon and claims the benefits of priority to Japanese Application No. 2020-182450, filed Oct. 30, 2020. The entire contents of all of the above applications are incorporated herein by reference.

BACKGROUND OF THE INVENTION

Field of the Invention

The present disclosure relates to a reverse-type light control sheet including an orientation layer.

DISCUSSION OF THE BACKGROUND

A reverse-type light control sheet includes a light control layer containing liquid crystal molecules, and a pair of orientation layers which are in contact with the light control layer and sandwich the light control layer. Each of the orientation layers may be, for example, a perpendicular orientation layer and orients the liquid crystal molecules such that the long axis of each liquid crystal molecule is substantially perpendicular to the orientation layer in a state in which no potential difference is applied between a pair of transparent electrode layers. Therefore, a reverse-type light control sheet is transparent in a state in which no potential difference is applied between a pair of transparent electrode layers. On the other hand, in a state in which a potential difference is applied between a pair of transparent electrode layers, liquid crystal molecules are oriented along the direction orthogonal to the electric field direction, and thus the light control sheet has an opaque state (see, for example, JP 2019-194654 A).

SUMMARY OF THE INVENTION

According to an aspect of the present invention, a light control sheet includes a first transparent electrode layer, a second transparent electrode layer, a light control layer including a resin layer formed between the first transparent electrode layer and the second transparent electrode layer, the resin layer including voids dispersed therein and filled with a liquid crystal composition including liquid crystal molecules, and a first orientation layer formed between the first transparent electrode layer and the light control layer such that a haze of the light control layer is increased by applying a voltage to the first transparent electrode layer. The light control layer has a first surface in contact with the first orientation layer, and an area ratio of the voids at the first surface is 49% or more where the area ratio is a percentage of a total area of all the voids to an area of the first surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

An embodiment of the light control sheet will be described with reference to FIGS. 1 to 9. In the following description, the light control device, the light control sheet, and examples will be sequentially described.

<Light Control Device>

Figure 1:
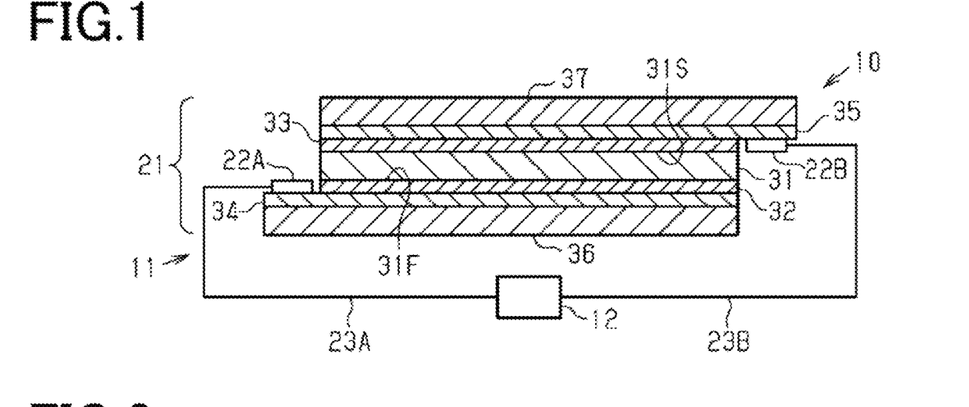
FIG. 1 is a cross-sectional view illustrating a structure of a light control device in an embodiment, together with a drive unit.

With reference to FIG. 1, the light control device will be described.

As illustrated in FIG. 1, a light control device 10 includes a light control unit 11 containing a reverse-type light control sheet 21, and a drive unit 12.

The light control sheet 21 includes a light control layer 31, a first orientation layer 32, a second orientation layer 33, a first transparent electrode layer 34, and a second transparent electrode layer 35. In the light control sheet 21, the first orientation layer 32 and the second orientation layer 33 sandwich the light control layer 31 in the thickness direction of the light control layer 31. The first transparent electrode layer 34 and the second transparent electrode layer sandwich the pair of orientation layers 32 and 33 in the thickness direction of the light control layer 31. The light control sheet 21 further includes a first transparent substrate 36 supporting the first transparent electrode layer 34, and a second transparent substrate 37 supporting the second transparent electrode layer 35.

The light control unit 11 includes a first electrode 22A mounted on a portion of the first transparent electrode 34, and a second electrode 22B mounted on a portion of the second transparent electrode layer 35. The light control unit 11 further includes a first wiring 23A connected to the first electrode 22A, and a second wiring 23B connected to the second electrode 22B. The first electrode 22A is connected to the drive unit 12 via the first wiring 23A, and the second electrode 22B is connected to the drive unit 12 via the second wiring 23B.

The light control layer 31 has a first surface 31F that is a surface in contact with the first orientation layer 32, and a second surface 31S that is a surface in contact with the second orientation layer 33. The light control layer 31 also includes a transparent resin layer and a liquid crystal composition. The resin layer has voids filled with the liquid crystal composition. The liquid crystal composition is filled into the voids of the resin layer. The liquid crystal composition contains liquid crystal molecules. An example of the liquid crystal molecules is any selected from the group consisting of those based on a Schiff base, azo, azoxy, biphenyl, terphenyl, benzoic acid ester, tolan, pyrimidine, cyclohexanecarboxylic acid ester, phenylcyclohexane, and dioxane.

The thickness of the light control layer 31 may be twice or more the minimum value in size of the voids and 11 μm or less, for example, 2 μm or more and 10 μm or less. Also, the thickness of the light control layer 31 may be 3.0 μm or more and 11.0 μm or less. The thickness of the light control layer 31 is preferably twice or more the size of the voids, in that the later-described at least two regions having relatively different densities can be generated in the light control layer 31. Further, when the thickness of the light control layer 31 is 11 μm or less, the liquid crystal molecules and the transparent resin layer are appropriately separated in response to light exposure of a coating solution containing the liquid crystal molecules during the production of the light control sheet 21.

The retention type of the liquid crystal composition is one selected from the group consisting of a polymer network type, a polymer dispersion type, and a capsule type. The polymer network type includes a transparent polymer network having a three-dimensional mesh shape. Voids of the mesh communicate with one another and retain the liquid crystal composition therein. The polymer network is an example of the resin layer. The polymer dispersion type includes a large number of isolated voids in the resin layer, and retains the liquid crystal composition in the voids dispersed in the polymer layer. The capsule type retains an encapsulated liquid crystal composition in the resin layer. The liquid crystal composition may contain, in addition to the above-described liquid crystal molecules, a monomer for forming the resin layer, a dichroic dye, and the like.

A material for forming the first orientation layer 32 and the second orientation film 33 is an organic compound, an inorganic compound, or a mixture thereof. Examples of the organic compound include polyimide, polyamide, polyvinyl alcohol, and cyanide compounds. Examples of the inorganic compound include silicon oxide and zirconium oxide. A material for forming the orientation layers 32 and 33 may be silicone. Silicone is a compound that contains an inorganic moiety and an organic moiety. The thickness of each of the orientation layers 32 and 33 may be, for example, 0.02 μm or more and 0.5 μm or less.

The first orientation layer 32 and the second orientation layer 33 may be, for example, a perpendicular orientation layer or a horizontal orientation layer. The perpendicular orientation layer orients the long axis direction of the liquid crystal molecules to cause it to be perpendicular to the surface opposite the surface in contact with the first transparent electrode 34 and to the surface opposite the surface in contact with the second transparent electrode layer 35. The horizontal orientation layer orients the long axis direction of the liquid crystal molecules to cause it to be substantially parallel to the surface opposite the surface in contact with the first transparent electrode layer 34 and to the surface opposite the surface in contact with the second transparent electrode layer 35. Thus, no matter which orientation layer the orientation layers 32 and 33 are, the orientation layers 32 and 33 regulate the orientation of the plurality of liquid crystal molecules contained in the light control layer 31. When at least one of the orientation layers 32 and 33 is a horizontal orientation layer, the light control sheet 21 can include a polarizing layer.

The first transparent electrode layer 34 and the second transparent electrode layer 35 have optical transparency that allows visible light to pass therethrough. The optical transparency of the first transparent electrode layer 34 enables visual recognition of an object through the light control sheet 21. The optical transparency of the second transparent electrode layer 35 enables visual recognition of an object through the light control sheet 21, in the same manner as the optical transparency of the first transparent electrode layer 34. The thickness of each of the transparent electrode layers 34 and 35 may be, for example, 0.005 μm or more and 0.1 μm or less. This can reduce cracks that may occur when the light control sheet 21 bends, while ensuring appropriate driving of the light control sheet 21.

A material for forming the transparent electrode layers 34 and 35 may be, for example, any one selected from the group consisting of indium tin oxide, fluorine-doped tin oxide, tin oxide, zinc oxide, carbon nanotubes, poly(3,4-ethylenedi-oxythiophene), and silver.

A material for forming the transparent substrates 36 and 37 may be a synthetic resin or an inorganic compound. Examples of the synthetic resin include polyester, polyacrylate, polycarbonate, and polyolefin. Examples of the polyester include polyethylene terephthalate and polyethylene naphthalate. An example of the polyacrylate is polymethyl methacrylate. Examples of the inorganic compound include silicon dioxide, silicon oxynitride, and silicon nitride. The thickness of the transparent substrates 36 and 37 may be, for example, 16 μm or more and 250 μm or less. When the thickness of the transparent substrates 36 and 37 is 16 μm or more, the light control sheet 21 can be easily processed and installed. When the thickness of the transparent substrates 36 and 37 is 250 μm or less, the light control sheet 21 can be produced by a roll-to-roll process.

The electrodes 22A and 22B may be, for example, a flexible printed circuit (FPC). The FPC includes a support layer, a conductor, and a protective layer. The conductor is interposed between the support layer and the protective layer. The support layer and the protective layer are formed of an insulating synthetic resin. The support layer and the protective layer may be formed of, for example, polyimide. The conductor may be formed of, for example, a thin metal film. A material for forming the thin metal film may be, for example, copper. The electrodes 22A and 22B are not limited to an FPC, and may be, for example, a metal tape.

The electrodes 22A and 22B are attached to the respective transparent electrode layers 34 and 35 via unillustrated conductive adhesive layers. In a portion of each of the electrodes 22A and 22B which is connected to the conductive adhesive layer, the conductor is exposed on the protective layer or the support layer.

The conductive adhesive layer may be formed of, for example, an anisotropic conductive film (ACF), an anisotropic conductive paste (ACP), an isotropic conductive film (ICF), an isotropic conductive paste (ICP), or the like. From the viewpoint of handling properties in the production process of the light control device 10, the conductive adhesive layer is preferably an anisotropic conductive film.

The wirings 23A and 23B may be formed of, for example, a metal wire and an insulating layer covering the metal wire. The wire may be formed of, for example, copper.

The drive unit 12 applies an AC voltage between the first transparent electrode layer 34 and the second transparent electrode layer 35. The drive unit 12 preferably applies an AC voltage having a rectangular waveform between the pair of the transparent electrode layers 34 and 35. It is noted that the drive unit 12 may apply an AC voltage having a shape other than a rectangular waveform between the pair of the transparent electrode layers 34 and 35. For example, the drive unit 12 may apply an AC voltage having a sinusoidal waveform between the pair of the transparent electrode layers 34 and 35.

In the light control layer 31, the orientation of the liquid crystal molecules changes in response to a voltage change which occurs between the two transparent electrode layers 34 and 35. The change in the orientation of the liquid crystal molecules changes the scattering degree, absorption degree, and transmission degree of visible light incident on the light control layer 31. The reverse-type light control sheet 21 has a relatively high haze during energization of the light control sheet 21, that is, while a potential difference is applied between the first transparent electrode layer 34 and the second transparent electrode layer 35. The reverse-type light control sheet 21 has a relatively low haze during non-energization of the light control sheet 21, that is, while no potential difference is applied between the first transparent electrode layer 34 and the second transparent electrode layer 35. For example, the reverse-type light control sheet 21 has an opaque state during energization of the light control sheet 21 and a transparent state during non-energization of the light control sheet 21.

The light control sheet 21 may be attached to, for example, a window of a mobile object such as a vehicle or an aircraft. Further, the light control sheet 21 may be attached to, for example, windows of various buildings such as a house, a station, and an airport, partitions installed in offices, display windows installed in stores, or screens for projecting images. The light control sheet 21 may have a flat or curved shape.

<Light Control Sheet>

Figure 2:
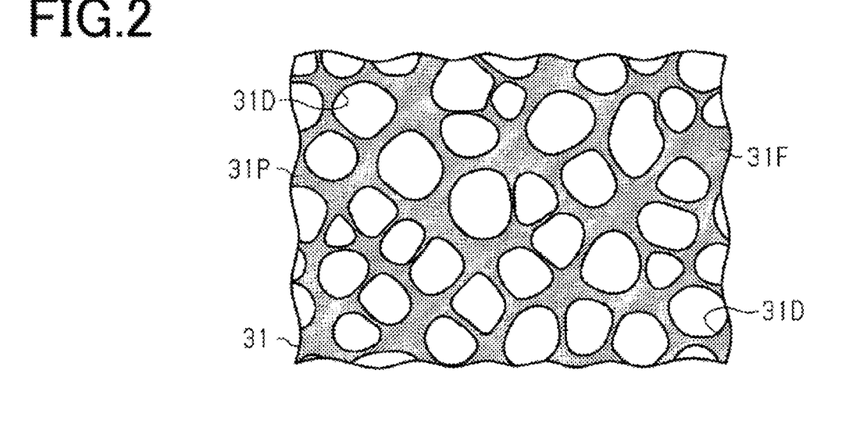
FIG. 2 is a plan view schematically illustrating a structure of a first surface of a light control layer included in a light control sheet illustrated in FIG. 1.
Figure 3:
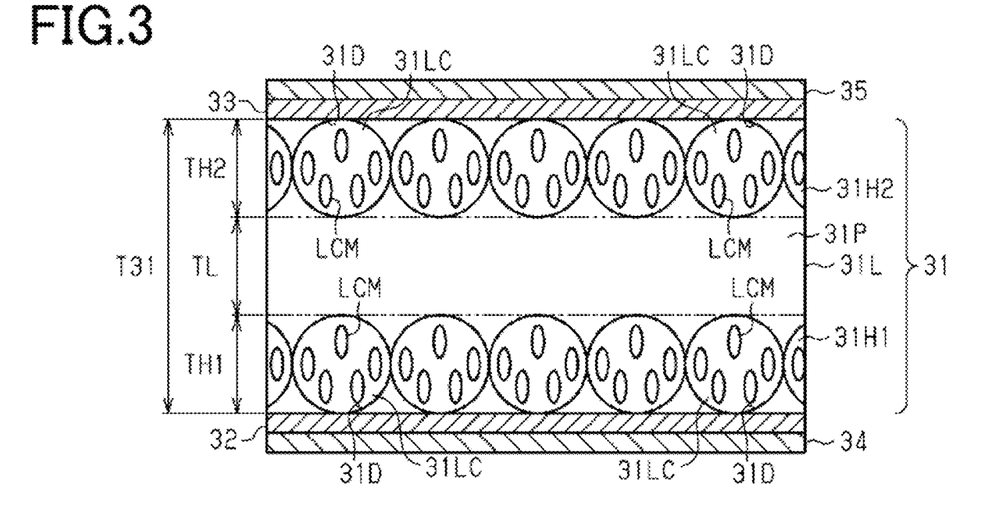
FIG. 3 is a cross-sectional view schematically illustrating a structure of the light control sheet included in the light control device illustrated in FIG. 1.
Figure 4:
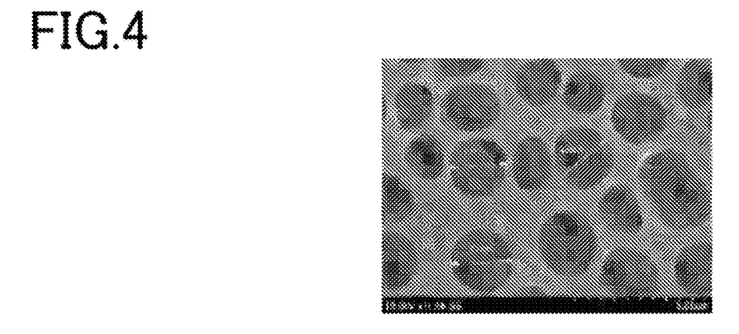
FIG. 4 is an SEM image obtained by imaging a first surface of a light control layer in a light control sheet of Example 1.

With reference to FIG. 2 and FIG. 3, the structure of the light control sheet 21 will be described in more detail.

FIG. 2 illustrates the planar structure of the light control layer 31 as seen from a viewpoint facing the first surface 31F of the light control layer 31. In FIG. 2, the resin layer is expressed with halftone dots for the purpose of simplifying the distinction between the voids and the resin layer contained in the light control layer 31. It is noted that although the first surface 31F of the light control layer 31 will be described in detail below, the second surface 31S of the light control layer 31 is different from the first surface 31F in terms of the position in the light control layer 31 while being common to the first surface 31F in terms of the size and distribution of the voids. Therefore, the detailed description of the second surface 31S of the light control layer 31 will be omitted.

FIG. 3 schematically illustrates the cross-sectional structure of the light control sheet 21. In FIG. 3, the transparent substrates 36 and 37 are not illustrated, for convenience of illustration. Also, in FIG. 3, the ratios in thickness of the light control layer 31 to each of the orientation layers 32 and 33 and to each of the transparent electrode layers 34 and 35 are larger than actual ratios. Further, in FIG. 3, the illustrated state of the light control layer 31 is a state in which no potential difference is applied between the pair of transparent electrode layers 34 and 35.

As illustrated in FIG. 2, the light control layer 31 includes a resin layer 31P in which voids 31D are dispersed, and a liquid crystal composition that contains liquid crystal molecules and fills the voids 31D. In FIG. 2, the liquid crystal composition is not illustrated, for convenience of illustration. As described above, the light control layer 31 contains a first surface 31F in contact with the first orientation layer 32. The light control layer 31 satisfies the following Condition 1.

(Condition 1) The area ratio of the voids 31D at the first surface 31F is 49% or more.

When the area ratio of the voids 31D at the first surface 31F is 49% or more, the voids 31D are likely to be positioned closer to the first surface 31F than to the central portion of the light control layer 31 in the thickness direction of the light control layer 31, as compared to when the area ratio is smaller. Therefore, since the orientation regulating force of the first orientation layer 32 acts on more liquid crystal molecules contained in the light control layer 31, the transparency of the light control sheet 21 can be increased in a state in which no potential difference is applied between the pair of transparent electrode layers 34 and 35.

The area ratio of the voids 31D at the first surface 31F is the percentage of the total area of all the voids 31D to the area of the first surface 31F. The area ratio of the voids 31D at the first surface 31F is calculated by the following method. That is, the area ratio is calculated by setting a calculation target region having a prescribed area at the first surface 31F. Also, the sum of the areas of all the voids 31D contained in the calculation target region is calculated. The area ratio of the voids 31D is the percentage of this sum to the area of the calculation target region.

The transparency of the light control sheet 21 can be expressed by the visible light transmittance of the light control sheet 21. In the light control sheet 21, the lower the haze value, the higher the transparency of the light control sheet 21, and the higher the haze value, the lower the transparency of the light control sheet 21. Also, the transparency of the light control sheet 21 can be expressed by the haze of the light control sheet 21. The haze is calculated by a method in accordance with JIS K 7136:2000. In the light control sheet 21, the lower the haze value, the higher the transparency of the light control sheet 21, and the higher the haze value, the lower the transparency of the light control sheet 21.

The light control layer 31 preferably satisfies at least one of the following Conditions 2 and Condition 3, in addition to the above-described Condition 1.

(Condition 2) The number of voids 31D per unit area at the first surface 31F is 31 or less.

As described herein, the unit area is 96 $\mu m^2$.

When the number of voids per unit area is 31 or less, voids are likely to be positioned closer to the first surface 31F in the light control layer 31 in a state in which no potential difference is applied between the pair of transparent electrode layers 34 and 35. Therefore, since the orientation regulating force of the orientation layers 32 and 33 acts on more liquid crystal molecules LCM (see FIG. 3) contained in the light control layer 31, the transparency of the light control sheet 21 can be increased in a state in which no potential difference is applied between the pair of transparent electrode layers 34 and 35.

(Condition 3) The number of voids 31D per unit area at the first surface 31F is 20 or more.

When the number of voids 31D per unit area is 20 or more, the light control sheet 21 can be prevented from having a high haze in a state in which no potential difference is applied between the pair of transparent electrode layers 34 and 35.

Since the size and distribution of the voids 31D at the second surface 31S are common to the size and distribution of the voids 31D at the first surface 31F as described above, the light control layer 31 satisfies the following Condition 4. Also, the light control layer 31 preferably satisfies at least one of the following Conditions 5 and 6.

(Condition 4) The area ratio of the voids 31D at the second surface 31S is 49% or more.

When the area ratio of the voids 31D at the second surface 31S is 49% or more, the voids 31D are likely to be positioned closer to the first surface 31F and the second surface 31S than to the central portion of the light control layer 31 in the thickness direction of the light control layer 31, in the light control sheet 21 including the pair of orientation layers 32 and 33. Therefore, since the orientation regulating force of the orientation layers 32 and 33 acts on more liquid crystal molecules contained in the light control layer 31, the transparency of the light control sheet 21 can be increased in a state in which no potential difference is applied between the pair of transparent electrode layers 34 and 35.

(Condition 5) The number of voids 31D per unit area at the second surface 31S is 31 or less.

(Condition 6) The number of voids 31D per unit area at the second surface 31S is 20 or more.

When the light control layer 31 satisfies Condition 5, the effect equivalent to that in the case where the light control layer 31 satisfies Condition 2 can be obtained. When the light control layer 31 satisfies Condition 6, the effect equivalent to that in the case where the light control layer 31 satisfies Condition 3 can be obtained.

As illustrated in FIG. 3, the resin layer 31P is positioned between the first transparent electrode layer 34 and the second transparent electrode layer 35. The voids 31D are dispersed in the resin layer 31P. A liquid crystal composition 31LC contains liquid crystal molecules LCM and fills the voids 31D. The light control layer 31 includes a first high density region 31H1 in which the density of the liquid crystal composition 31LC per unit thickness is high, and a low density region 31L in which the density of the liquid crystal composition 31LC per unit thickness is low. The first high density region 31H1 is in contact with the first orientation layer 32.

In other words, the density of the liquid crystal composition 31LC is the lowest in the middle in the thickness direction of the light control layer 31. It is noted that the middle in the thickness direction of the light control layer 31 is a portion closer to the center of the light control layer 31 than to the pair of surfaces facing in the thickness direction of the light control layer 31. The density of the liquid crystal composition 31LC per unit thickness in each region of the light control layer 31 is calculated by dividing the volume of the liquid crystal composition 31LC contained in each region by the thickness of each region. Also, the light control layer 31 is preferably configured such that the density of the liquid crystal composition 31LC is the lowest in a portion containing the center in the thickness direction of the light control layer 31. It is noted that since the light control layer 31 is extraordinarily thin, it is practically difficult to calculate the volume of the liquid crystal composition 31LC contained in the light control layer 31. Therefore, in the present disclosure, each density is calculated using the area of the liquid crystal composition 31LC calculated from an SEM image obtained by imaging a cross section of the light control layer 31, and the area of the light control layer 31.

The first orientation layer 32 may be, for example, a perpendicular orientation layer and typically orients the liquid crystal molecules LCM such that the long axes of the liquid crystal molecules LCM are orthogonal to the first transparent electrode layer 34. However, the first orientation layer 32 may orient the liquid crystal molecules LCM such that the long axes of the liquid crystal molecules LCM are inclined by several degrees relative to the perpendicular direction, as long as the long axes are determined to be substantially perpendicular to the first transparent electrode layer 34. In this case, the liquid crystal molecules LCM are negative liquid crystal molecules having negative dielectric anisotropy. The density of the liquid crystal composition 31LC in the first high density region 31H1 is higher than the density of the liquid crystal composition 31LC in the low density region 31L.

Since the liquid crystal composition 31LC has a high density in a region where a distance from the first orientation layer 32 is small, the quantity of the liquid crystal molecules LCM to be oriented by the orientation regulating force of the first orientation layer 32 in the multiple liquid crystal molecules LCM can be increased. Therefore, the transparency of the light control sheet 21 can be increased in a state in which no potential difference is applied between the first transparent electrode layer 34 and the second transparent electrode layer 35.

The light control layer 31 further includes a second high density region 31H2. The second high density region 31H2 is in contact with the second orientation layer 33 and has a density of the liquid crystal composition 31LC which is higher than the density of the liquid crystal composition 31LC in the low density region 31L. The low density region 31L is interposed between the first high density region 31H1 and the second high density region 31H2 in the cross section along the thickness direction of the light control layer 31.

In the light control layer 31, the liquid crystal molecules LCM are oriented according to the orientation regulating force of the orientation layers 32 and 33 in the vicinity of the pair of surfaces facing in the thickness direction of the light control layer 31. Therefore, the optical transparency of the light control sheet 21 can be further increased in a state in which no potential difference is applied between the first transparent electrode layer 34 and the second transparent electrode layer 35.

The light control layer 31 is constituted by the first high density region 31H1, the second high density region 31H2, and the low density region 31L. A value obtained by dividing the area of the voids 31D by the thickness of the light control layer 31 in the cross section along the thickness direction of the light control layer 31 is the density of the voids 31D per unit thickness.

The density of the voids 31D in the first high density region 31H1 per unit thickness and the density of the voids 31D in the second high density region 31H2 per unit thickness are higher than the density of the voids 31D in the low density region 31L per unit thickness.

This enables the density of the liquid crystal composition 31LC in the first high density region 31H1 and the density of the liquid crystal composition 31LC in the second high density region 31H2 to be higher than the density of the liquid crystal composition 31LC in the low density region 31L.

The density of the voids 31D per unit thickness is calculated by dividing the total area of the voids 31 contained in each region by the thickness of each region.

In the light control layer 31, the thickness TH1 of the first high density region 31H1, the thickness TH2 of the second high density region 31H2, and the thickness TL of the low density region 31L are, for example, about the same as one another. That is, the thickness TH1 of the first high density region 31H1, the thickness TH2 of the second high density region 31H2, and the thickness TL of the low density region 31L are each about one-third the thickness T31 of the light control layer 31. The thickness TL of the low density region 31L may be either thicker or thinner than the thicknesses TH1 and TH2 of the high density regions 31H1 and 31H2. The thickness TH1 of the first high density region 31H1 may be either same as or different from the thickness of the second high density region 31H2.

In the cross section along the thickness direction of the light control layer 31, the percentage ([SD/SL]×100) of the sum (SD) of the areas of the voids 31D contained in the low density region 31L to the area (SL) of the low density region 31L is preferably 10% or less. Since this can reduce the ratio of the liquid crystal composition 31LC retained in the voids 31D in the low density region 31L, the liquid crystal molecules LCM contained in the low density region 31L can be prevented from increasing the opaqueness of the light control sheet 21 in a state in which no potential difference is applied between the first transparent electrode layer 34 and the second transparent electrode layer 35.

Furthermore, the low density region 31L preferably does not have the voids 31D. In other words, the low density region 31L preferably does not include the liquid crystal composition 31LC. Since this facilitates the orientation of all of the liquid crystal molecules LCM contained in the light control layer 31 according to the orientation regulating force of the orientation layers 32 and 33, the haze of the light control sheet 21 can be further decreased in a state in which no voltage difference is applied between the first transparent electrode layer 34 and the second transparent electrode layer 35.

Thus, in the low density region 31L, the sum SD of the areas of the voids 31D to the area SL of the low density region 31L is preferably 10% or less, more preferably 5% or less, and most preferably 0%.

Also, the voids 31D can be positioned in a range of 3.0 μm or less from the first orientation layer 32 and in a range of 3.0 μm or less from the second orientation layer 33, in the cross section along the thickness direction of the light control layer 31. In other words, the thickness TH1 of the first high density region 31H1 can be 3.0 μm or less, and the thickness TH2 of the second high density region 31H2 can be 3.0 μm or less.

The range in which the voids 31D are positioned with respect to the first orientation layer 32 is the maximum value in the distance between the voids 31D positioned closer to the first orientation layer 32 than to the central portion of the light control layer 31 and the surface of the first orientation layer 32 in contact with the light control layer 31 in the cross section along the thickness direction of the light control layer 31. The range in which the voids 31D are positioned with respect to the second orientation layer 33 is the maximum value of the distance between the voids 31D positioned closer to the second orientation layer 33 than to the central portion of the light control layer 31 and the surface of the second orientation layer 33 in contact with the light control layer 31 in the cross section along the thickness direction of the light control layer 31.

Since the voids 31D are positioned in the range of 3.0 μm or less from the orientation layers 32 and 33 in the cross section along the thickness direction of the light control layer 31, the reliability with which the liquid crystal molecules LCM retained in the voids 31D are oriented according to the orientation regulating force can be increased.

The voids 31D contained in the first high density region 31H1 are preferably in contact with the first orientation layer 32. The voids 31D contained in the second high density region 31H2 are preferably in contact with the second orientation layer 33. In other words, the voids 31D included in the light control layer 31 are preferably constituted only by a single-layer void layer along the interface between the first orientation layer 32 and the light control layer 31 and a single-layer void layer along the interface between the second orientation layer 33 and the light control layer 31.

Since the voids 31D contained in the first high density region 31H1 and the voids 31D contained in the second high density region 31H2 can retain the liquid crystal composition 31LC in contact with the orientation layers 32 and 33, the orientation regulating force of the orientation layers 32 and 33 is likely to act on the entirety of the liquid crystal composition 31LC retained in the voids 31D. This can further increase the transparency of the light control sheet 21 in a state in which no potential difference is applied between the first transparent electrode layer 34 and the second transparent electrode layer 35.

In the light control sheet 21, the thickness T31 of the light control layer 31 is 3.0 μm or more and 11.0 μm or less, and the size of the voids 31D is 1.0 μm or more and 2.5 μm or less.

Since the thickness of the light control layer 31 is 3.0 μm or more and 11.0 μm or less, the voids 31D can be prevented from being formed in a position separate from the pair of surfaces facing in the thickness direction of the light control layer 31. Furthermore, since the size of the voids 31D is 1.0 μm or more and 2.5 μm or less, the liquid crystal composition 31LC is retained in the vicinity of the orientation layers 32 and 33. This can increase the transparency of the light control sheet 21 in a state in which no voltage difference is applied between the first transparent electrode layer 34 and the second transparent electrode layer 35.

From the viewpoint of scattering properties of the light control sheet 21, the size of the voids 31D is preferably 0.38 μm or more and 3.0 μm or less. When the size of the voids 31D is in the range of 0.38 μm or more and 3.0 μm or less, scattering to occur in the light control sheet 21 can be made at a suitable level. When the size of the voids 31D is 0.38 μm or more, scattering properties, especially scattering properties in the visible range, can be sufficiently ensured. When the size of the voids 31D is 3.0 μm or less, the optical action by liquid crystals, that is, the action that a light component passing through the voids becomes larger than a light component subject to scattering, is suppressed, which facilitates the exertion of an appropriate light control effect.

In the cross section along the thickness direction of the light control sheet 21, the size of the void 31D having a circular shape is the diameter of the void 31D. In the cross section along the thickness direction of the light control sheet 21, the size of the void 31D having an oval shape is the major axis of the void 31D. In the cross section along the thickness direction of the light control sheet 21, the size of the void 31D having an indefinite shape is the diameter of a circle circumscribing the void 31D.

In the cross section along the thickness direction of the light control layer 31, the liquid crystal molecules LCM retained at a smaller distance from the orientation layers 32 and 33 are more likely to be oriented according to the orientation regulating force of the orientation layers 32 and 33. When the size of the voids 31D is 2.5 µm or less as described above, the liquid crystal molecules LCM retained in the voids 31D positioned in the high density regions 31H1 and 31H2 are likely to be oriented according to the orientation regulating force.

In forming the light control sheet 21, the transparent substrates 36 and 37 on which the transparent electrode layers 34 and 35 are respectively formed are firstly prepared. Then, the orientation layers 32 and 33 are formed on the transparent electrode layers 34 and 35 respectively. Next, a coating solution is applied between the pair of orientation layers 32 and 33. The coating solution contains a polymerizable composition for forming the resin layer 31P, and liquid crystal molecules LCM. The polymerizable composition is a monomer or oligomer which is polymerizable by irradiation with ultraviolet light. Thereafter, the coating solution is irradiated with ultraviolet light through the transparent electrode layers 34 and 35. Accordingly, the resin layer 31P having the voids 31D is formed, and the liquid crystal molecules LCM are retained in the voids 31D.

While the coating solution is cured, the liquid crystal composition 31LC containing the liquid crystal molecules LCM is separated from the polymerizable composition, and the liquid crystal composition 31LC is positioned at a plurality of locations within the polymerizable composition. Next, before the polymerizable composition is cured, the liquid crystal composition 31LC moves toward the orientation layers 32 and 33. Thereafter, the polymerizable composition is cured so that the resin layer 31P having the voids 31D each surrounding the liquid crystal composition 31LC is formed. Until the resin layer 31P is formed, the liquid crystal compositions 31LC separate from each other gather so that the voids 31D to be formed in the resin layer 31P continue to expand. In this regard, when the size of the voids 31D is 1.0 µm or more, the possibility that the polymerizable composition will be cured before the voids 31D move to the vicinity of the orientation layers 32 and 33 can be reduced. As a result, the number of voids 31D in the low density region 31L of the light control layer 31 can be reduced.

EXAMPLES

With reference to FIGS. 4 to 9, examples will be described.

The light control sheets of Examples 1 to 7 and the light control sheet of Comparative Example 1 were obtained by the below-described production method.

Example 1

A pair of PET substrates each including an ITO film formed thereon was prepared. The ITO film had a thickness of 30 nm, and the PET substrate had a thickness of 125 µm. On each of the ITO films, a perpendicular orientation layer having a thickness of 100 nm was formed using a bar coater. As a coating solution for forming the perpendicular orientation film, a coating solution having the following make-up was prepared.
Sunever SE-610 (manufactured by Nissan Chemical Industries, Ltd.) 5 parts by weight
N-Methyl-2-pyrrolidone 75 parts by weight
2-Butoxyethanol 20 parts by weight Next, one of the perpendicular orientation layers was coated with a coating solution for forming a light control layer, which contained a polymerizable composition and liquid crystal molecules. As the coating solution for forming a light control layer, a coating solution having the following make-up was prepared.
MLC-6608 (n type liquid crystals) (manufactured by Merck Co.) 50 parts by weight
Isobornyl acrylate (product name: A-IB, manufactured by Shin Nakamura Chemical Co., Ltd.) 47 parts by weight
Pentaerythritol tetrakis(3-mercaptobutyrate) (manufactured by Showa Denko K. K.) 1 part by weight
1-Hydroxycyclohexyl phenyl ketone (manufactured by IGM Resins B. V.) 1 part by weight
PMMA spherical particles, particle diameter 10 (manufactured by Sekisui Plastics Co., Ltd.) 1 part by weight Then, the other of the perpendicular orientation layers was disposed on the coating film so that the coating film was interposed between the pair of perpendicular orientation layers. From each side in the thickness direction of the coating film, the coating film was irradiated with ultraviolet light through the PET substrate, the ITO film, and the perpendicular orientation layer.

One factor that influences the quality of the light control sheet is the step of exposing the coating film, that is, the light control layer, to light when producing the light control sheet. More particularly, in the light exposure process, an optimal light exposure quantity, i.e., an optimal integrated light quantity, is defined in consideration of various conditions such as materials contained in a coating liquid and the thickness of a coating film. The integrated light quantity is calculated by multiplying the illuminance of irradiation with ultraviolet light by the irradiation time of ultraviolet light. In Examples and Comparative Example described below, a light control sheet obtained by appropriately changing the illuminance and irradiation time for achieving an optimal integrated light quantity is described. In all of light control sheets illustrated in Examples 1 to 7 and Comparative Example 1, the thickness of the light control sheet was set to 7.0 µm.

In Example 1, the coating film was irradiated with ultraviolet light by setting the illuminance of ultraviolet light to 10 mW/cm$^2$ such that the integrated light quantity became 600 mJ/cm$^2$.

Example 2

A light control sheet of Example 2 was obtained by the same method as that in Example 1, except that the illuminance in irradiating the coating film with ultraviolet light was changed to mW/cm$^2$ in Example 1.

Example 3

A light control sheet of Example 3 was obtained by the same method as that in Example 1, except that the illuminance in irradiating the coating film with ultraviolet light was changed to mW/cm$^2$ in Example 1.

Example 4

A light control sheet of Example 4 was obtained by the same method as that in Example 1, except that the illuminance in irradiating the coating film with ultraviolet light was changed to mW/cm$^2$ in Example 1.

Example 5

A light control sheet of Example 5 was obtained by the same method as that in Example 1, except that the illuminance in irradiating the coating film with ultraviolet light was changed to mW/cm² in Example 1.

Example 6

A light control sheet of Example 6 was obtained by the same method as that in Example 1, except that the illuminance in irradiating the coating film with ultraviolet light was changed to mW/cm² in Example 1.

Example 7

A light control sheet of Example 7 was obtained by the same method as that in Example 1, except that the illuminance in irradiating the coating film with ultraviolet light was changed to mW/cm² in Example 1.

Comparative Example 1

A light control sheet of Comparative Example 1 was obtained by the same method as that in Example 1, except that the illuminance in irradiating the coating film with ultraviolet light was changed to 200 mW/cm² in Example 1.
<Evaluation Method>
<Area Ratio and Number of Voids>

The first surface of the resin layer was imaged using a scanning electron microscope, and the obtained image was used to calculate the area ratio of the voids at the first surface and the number of voids at the first surface. For calculating the area ratio of the voids and the number of voids, a test piece having a square shape with a side length of 10 cm was cut out from the light control sheet of each of Examples and Comparative Example 1. Then, each test piece was immersed in isopropyl alcohol thereby to remove the liquid crystal composition from the resin layer. Next, in each test piece, the first orientation layer was peeled from the light control layer at a boundary between the light control layer and the first orientation layer. This exposed the first surface of the light control layer in each light control sheet.

Then, the first surface of the test piece from which the liquid crystal composition had been removed was imaged using a scanning electron microscope. In imaging, a rectangular region with a length of 12 μm, a length of 8 μm, and an area of 96 μm² was set as the imaging region. Five locations were set as the imaging regions on the first surface of the test piece. It is noted that the five locations as the imaging regions were set such that the distance between two adjacent imaging regions is 1 mm or more. The area ratio of the voids in each image was calculated by binarizing the image obtained for each imaging region. In binarizing the image, the threshold in luminance was set to 108. The area ratio of the voids in each test piece was calculated by obtaining an average in the area ratio of the voids for five images. Also, the number of voids in the image obtained for each test piece was counted. The number of voids in each test piece was calculated by obtaining an average in the number of voids for five images.
<Haze>

For each of the light control sheets of Examples 1 to 7 and Comparative Example 1, haze when opaque and haze when transparent were calculated. The haze was calculated by the method in accordance with JIS K 7136:2000. In each light control sheet, a state in which no potential difference is applied between the pair of transparent electrode layers, i.e., a state in which an AC voltage is not applied between the pair of transparent electrode layers, is set to "when transparent". Also, a state in which an AC voltage is applied between the pair of transparent electrode layers, and further, the haze of the light control sheet is saturated, is set to "when opaque".
<Clarity>

For each of the light control sheets of Examples 1 to 7 and Comparative Example 1, clarity when opaque was calculated. The clarity is calculated according to the following Formula (1), where Lc is the intensity of the light propagating straight along the propagating direction of the parallel light LP that has entered the light control layer 31, of the light that has passed through the light control layer 31, and LR is the intensity of the narrow-angle scattered light having an angle within ±2.5° relative to the propagating direction of the parallel light LP. Similarly to the calculation of haze, a state in which an AC voltage is applied between the pair of transparent electrode layers, and further, the haze of the light control sheet is saturated, is set to "when opaque".

$$100 \times (LC-LR)/(LC+LR) \qquad \text{Formula (1)}$$

<Evaluation Results>

For Examples 1 and 5 and Comparative Example 1, the result of imaging the first surface and cross section of each test piece was as illustrated in FIGS. 4 to 9. The evaluation results were as illustrated in Tables 1 and 2 below. It is noted that FIGS. 4 to 9 sequentially illustrate SEM images obtained by imaging the first surface and cross section of the light control sheets of Examples 1 and 5 and Comparative Example 1.

TABLE 1

|  |  | Unit | Ex. 1 | Ex. 2 | Ex. 3 | Ex. 4 |
|---|---|---|---|---|---|---|
| Area ratio | | % | 49 | 53 | 55 | 55 |
| Number of voids | | | 18 | 20 | 27 | 29 |
| When opaque | Clarity | % | 70.5 | 64.0 | 62.3 | 63.6 |
|  | Haze | % | 93.2 | 93.5 | 93.3 | 94.0 |
| When transparent | Haze | % | 11.5 | 8.7 | 8.6 | 7.6 |

TABLE 2

|  |  | Unit | Ex. 5 | Ex. 6 | Ex. 7 | Comp. Ex. 1 |
|---|---|---|---|---|---|---|
| Area ratio | | % | 60 | 57 | 53 | 45 |
| Number of voids | | | 28 | 33 | 33 | 140 |
| When opaque | Clarity | % | 59.9 | 62.5 | 74.1 | 97.5 |
|  | Haze | % | 94.5 | 95.1 | 95.0 | 88.2 |
| When transparent | Haze | % | 7.1 | 11.9 | 31.6 | 53.5 |

In the light control sheets of Examples 1 to 7, it was demonstrated that the area ratio of the voids at the first surface of the light control layer was 49% or more. In contrast to this, in Comparative Example 1, it was demonstrated that the area ratio of the voids at the first surface was 45%, which was less than 49%. Further, it was demonstrated that the haze when transparent in the light control sheets of Examples 1 to 7 was drastically improved, as compared to the haze when transparent in the light control sheet of Comparative Example 1. Thus, it can be said that when the area ratio of the voids at the first surface of the light control layer is 49% or more, the value of the haze when transparent decreases, i.e., the transparency while no voltage is applied is increased.

Figure 5:
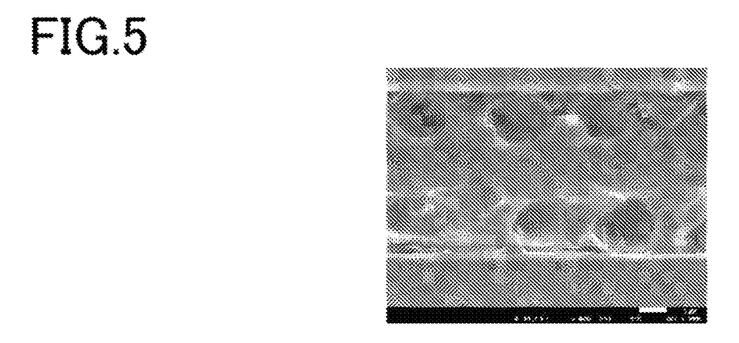
FIG. 5 is an SEM image obtained by imaging a cross section of the light control layer in the light control sheet of Example 1.
Figure 6:
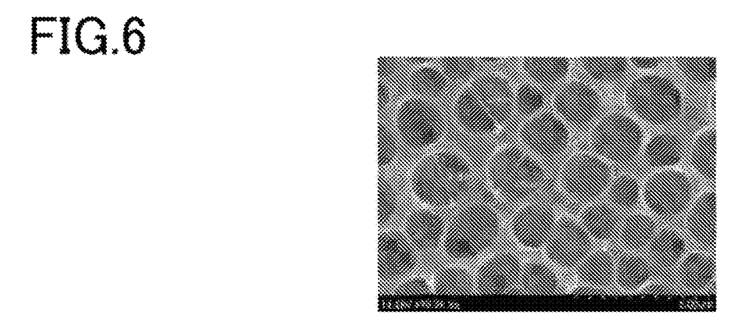
FIG. 6 is an SEM image obtained by imaging a first surface of a light control layer in a light control sheet of Example 5.
Figure 7:
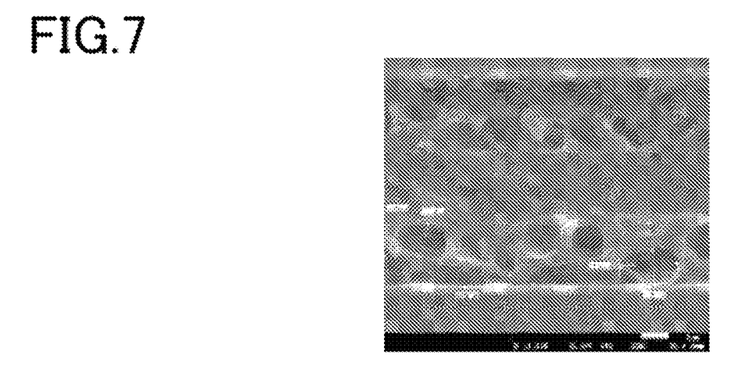
FIG. 7 is an SEM image obtained by imaging a cross section of the light control layer in the light control sheet of Example 5.
Figure 8:
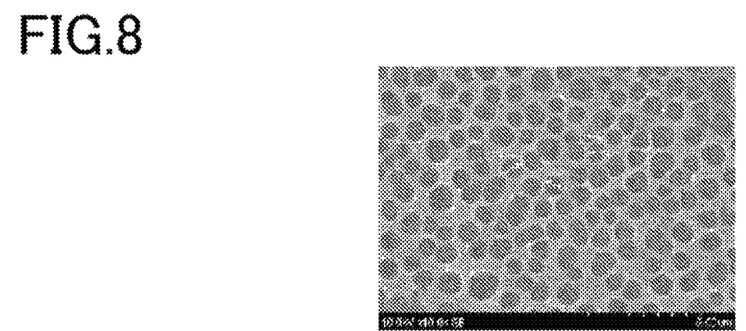
FIG. 8 is an SEM image obtained by imaging a first surface of a light control layer in a light control sheet of Comparative Example 1.
Figure 9:
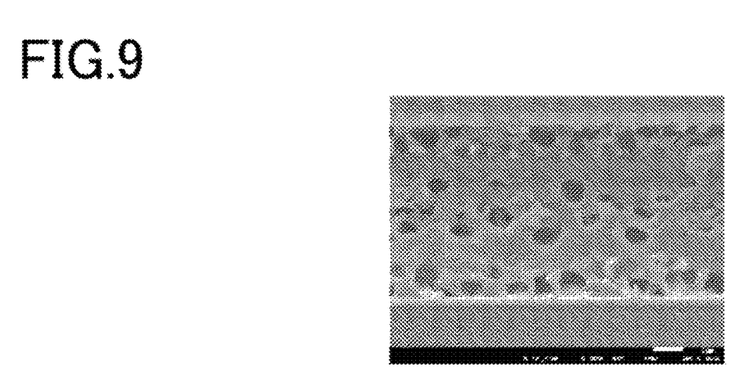
FIG. 9 is an SEM image obtained by imaging a cross section of the light control layer in the light control sheet of Comparative Example 1.

Also, the cross-sectional structures of the light control layers illustrated in FIGS. 5, 7, and 9 demonstrate that in the light control sheets of Examples 1 and 5, all of the voids included in the light control layer are in contact with the first surface or the second surface. In contrast to this, it was demonstrated that in the light control sheet of Comparative Example 1, some of the voids included in the light control layer are in contact with the first surface or the second surface, and the remaining voids are positioned in the central portion of the light control layer in the thickness direction of the light control layer. Thus, it can be said that the area ratio of the voids at the first surface is an index to express the distribution of the voids in the thickness direction of the light control layer, and the number of voids positioned in the vicinity of the first surface of the light control layer can be increased when the area ratio of the voids at the first surface is 49% or more.

A comparison of the haze values when transparent in the light control sheets of Examples 1 to 7 shows that the haze values in Examples 2 to 5 have been improved, as compared to the haze values in Examples 1, 6, and 7. From these results, it can be said that the transparency of the light control sheet while no voltage is applied is further increased when the area ratio of the voids at the first surface is 49% or more, and further, the number of voids per unit area is 20 or more and 28 or less. That is, it can be said that in the light control layers of Examples 2 to 5, the size of the voids positioned at the first surface is within the suitable range.

Also, it was demonstrated that in Examples 6 and 7 and Comparative Example 1, white dot-like regions were observed when the light control sheet was transparent, which increased the haze value when transparent. The dot-like regions indicate that voids are formed in positions separate from the orientation layers to a degree that the orientation regulating force of the orientation layers is unlikely to act, in the thickness direction of the light control layer, and the liquid crystal composition is filled into the voids. In contrast to this, in the light control sheet of Example 1, the dot-like region, which was observed in Examples 6 and 7 and Comparative Example 1, was not observed.

Therefore, it can be said that when the number of voids per unit area is 29 or less, i.e., when the size of the voids is not less than a prescribed size, the voids can be prevented from being formed in a position separate from the orientation layers in the thickness direction of the light control layer, which increases the transparency of the light control sheet while no voltage is applied. In contrast to this, it can be said that when the number of voids per unit area is 20 or more, i.e., when the size of the voids is not more than a prescribed size, light can be prevented from scattering depending on the size of the voids, which increases the transparency of the light control sheet while no voltage is applied.

Also, it is demonstrated that in the light control sheet of each of Examples and Comparative Example, results equivalent to the above-described results for the first surface can also be obtained for the second surface of the light control layer.

In Examples 1 to 7 and Comparative Example 1, the illuminance of irradiation with ultraviolet irradiation in producing the light control sheet was changed. In Examples 8 to 16 described below, the integrated light quantity was changed in three ways for each of three different illuminances.

Example 8

A light control sheet of Example 8 was obtained by the same method as that in Example 2, except that the integrated light quantity was changed to 450 mJ/cm$^2$ in Example 2.

Example 9

A light control sheet of Example 9 was obtained by the same method as that in Example 2.

Example 10

A light control sheet of Example 10 was obtained by the same method as that in Example 2, except that the integrated light quantity was changed to 750 mJ/cm$^2$ in Example 2.

Example 11

A light control sheet of Example 11 was obtained by the same method as that in Example 4, except that the integrated light quantity was changed to 450 mJ/cm$^2$ in Example 4.

Example 12

A light control sheet of Example 12 was obtained by the same method as that in Example 4.

Example 13

A light control sheet of Example 13 was obtained by the same method as that in Example 4, except that the integrated light quantity was changed to 750 mJ/cm$^2$ in Example 4.

Example 14

A light control sheet of Example 14 was obtained by the same method as that in Example 6, except that the integrated light quantity was changed to 450 mJ/cm$^2$ in Example 6.

Example 15

A light control sheet of Example 15 was obtained by the same method as that in Example 6.

Example 16

A light control sheet of Example 16 was obtained by the same method as that in Example 6, except that the integrated light quantity was changed to 750 mJ/cm$^2$ in Example 6.

TABLE 3

|  |  | Unit | Ex. 8 | Ex. 9 | Ex. 10 | Ex. 11 | Ex. 12 | Ex. 13 |
|---|---|---|---|---|---|---|---|---|
| Area ratio |  | % | 54 | 53 | 55 | 51 | 55 | 52 |
| Number of voids |  |  | 22 | 20 | 23 | 31 | 29 | 26 |
| When opaque | Clarity | % | 66.0 | 64.0 | 65.2 | 63.7 | 63.6 | 61.0 |
|  | Haze | % | 92.7 | 93.5 | 93.4 | 93.7 | 94.0 | 94.3 |
| When transparent | Haze | % | 8.4 | 8.7 | 9.2 | 7.8 | 7.6 | 7.5 |

TABLE 4

|  | Unit | Ex. 14 | Ex. 15 | Ex. 16 |
|---|---|---|---|---|
| Area ratio | % | 52 | 57 | 53 |
| Number of voids |  | 35 | 33 | 35 |
| When opaque Clarity | % | 64.4 | 62.5 | 60.9 |
| Haze | % | 94.8 | 95.0 | 95.0 |
| When transparent Haze | % | 10.8 | 10.0 | 11.4 |

<Evaluation Method>

By the same method as the method for evaluating the light control sheets of Examples 1 to 7 and Comparative Example 1, the area ratio of the voids, the number of voids, clarity, and haze were evaluated.

<Evaluation Results>

For the light control sheets of Examples 8 to 16, the evaluation results were as illustrated in Table 3 and Table 4.

According to the light control sheets of Examples 8 to 16, it was demonstrated that the haze values when transparent in the light control sheets of Examples 8 to 13 were improved, as compared to the haze values when transparent in the light control sheets of Examples 14 to 16. These results demonstrated that the transparency of the light control sheet while no voltage is applied is further increased when the area ratio of the voids at the first surface of the light control sheet is 49% or more, and further, the number of voids per unit area is 31 or less.

Also, it is demonstrated that in the light control sheet of each of Examples and Comparative Example, results equivalent to the above-described results for the first surface can also be obtained for the second surface of the light control layer.

As described above, an embodiment of the light control sheet can achieve the following advantageous effects.

(1) When the area ratio of the voids 31D at the first surface 31F is 49% or more, the voids 31D are likely to be positioned closer to the first surface 31F than to the central portion of the light control layer 31 in the thickness direction of the light control layer 31. Therefore, since the orientation regulating force of the first orientation layer 32 acts on more liquid crystal molecules contained in the light control layer 31, the transparency of the light control sheet 21 can be increased in a state in which no potential difference is applied between the pair of transparent electrode layers 34 and 35.

(2) When the number of voids per unit area is 31 or less, voids are likely to be positioned closer to the first surface 31F in the light control layer 31 in a state in which no potential difference is applied between the pair of transparent electrode layers 34 and 35. Therefore, since the orientation regulating force of the orientation layers 32 and 33 acts on more liquid crystal molecules LCM contained in the light control layer 31, the transparency of the light control sheet 21 can be increased in a state in which no potential difference is applied between the pair of transparent electrode layers 34 and 35.

(3) When the number of voids 31D per unit area is 20 or more, the light control sheet 21 can be prevented from having a high haze in a state in which no potential difference is applied between the pair of transparent electrode layers 34 and 35.

(4) When the area ratio of the voids 31D at the second surface 31S is 49% or more, the voids 31D are likely to be positioned closer to the first surface 31F and the second surface 31S than to the central portion of the light control layer 31 in the thickness direction of the light control layer 31, in the light control sheet 21 including the pair of orientation layers 32 and 33. Therefore, since the orientation regulating force of the orientation layers 32 and 33 acts on more liquid crystal molecules contained in the light control layer 31, the transparency of the light control sheet 21 can be increased in a state in which no potential difference is applied between the pair of transparent electrode layers 34 and 35.

The above-described embodiment may be implemented with the following modifications.

<Orientation Layer>

The light control sheet 21 may not include the second orientation layer 33 while including the first orientation layer 32. In this case, the effect corresponding to the above-described (1) can be obtained by satisfying the condition that the area ratio of the voids at the first surface 31F is 49% or more.

The present application addresses the following. A reverse-type light control sheet is newly requested to increase its transparency in a state in which no potential difference is applied between a pair of transparent electrode layers, while achieving opaqueness in a state in which a potential difference is applied between a pair of transparent electrode layers.

An aspect of the present disclosure is to provide a light control sheet which can increase the transparency in a state in which no potential difference is applied between a pair of transparent electrode layers.

An aspect of the light control sheet includes: a first transparent electrode layer; a second transparent electrode layer; a light control layer including a resin layer positioned between the first transparent electrode layer and the second transparent electrode layer, and a liquid crystal composition containing liquid crystal molecules, the resin layer having voids dispersed therein, the liquid crystal composition filling the voids; and a first orientation layer interposed between the first transparent electrode layer and the light control layer and configured to increase the haze of the light control layer during application of a voltage to the first transparent electrode layer. The light control layer has a first surface in contact with the first orientation layer. The percentage of the total area of all the voids to the area of the first surface is the area ratio of the voids at the first surface, and the area ratio is 49% or more.

According to the above-described light control sheet, the voids are likely to be positioned closer to the first surface than to the central portion of the light control layer in the thickness direction of the light control layer when the area ratio of the voids at the first surface is 49% or more, as compared to when the area ratio is smaller. Therefore, since the orientation regulating force of the first orientation layer acts on more liquid crystal molecules contained in the light control layer, the transparency of the light control sheet can be increased in a state in which no potential difference is applied between the pair of transparent electrode layers.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
   a first transparent electrode layer;
   a second transparent electrode layer;
   a light control layer including a resin layer formed between the first transparent electrode layer and the second transparent electrode layer, the resin layer including voids dispersed therein and filled with a liquid crystal composition including liquid crystal molecules; and a first orientation layer formed between the first transparent electrode layer and the light control layer such that a haze of the light control layer is increased by applying a voltage to the first transparent electrode layer, wherein the light control layer has a first surface in contact with the first orientation layer, and an area ratio of the voids at the first surface is 49% or more where the area ratio is a percentage of a total area of all the voids to an area of the first surface.

2. The light control sheet according to claim 1, wherein the number of voids per unit area at the first surface is 31 or less.

3. The light control sheet according to claim 1, wherein the number of voids per unit area at the first surface is 20 or more.

4. The light control sheet according to claim 2, wherein the number of voids per unit area at the first surface is 20 or more.

5. The light control sheet according to claim 1, further comprising:

a second orientation layer formed between the light control layer and the second transparent electrode layer in a thickness direction of the light control layer, wherein the light control layer has a second surface in contact with the second orientation layer, and the area ratio of the voids at the second surface is 49% or more.

6. The light control sheet according to claim 2, further comprising:

a second orientation layer formed between the light control layer and the second transparent electrode layer in a thickness direction of the light control layer, wherein the light control layer has a second surface in contact with the second orientation layer, and the area ratio of the voids at the second surface is 49% or more.

7. The light control sheet according to claim 3, further comprising:

a second orientation layer formed between the light control layer and the second transparent electrode layer in a thickness direction of the light control layer, wherein the light control layer has a second surface in contact with the second orientation layer, and the area ratio of the voids at the second surface is 49% or more.

8. The light control sheet according to claim 1, wherein the light control layer has a thickness of 3.0 μm-11.0 μm.

9. The light control sheet according to claim 2, wherein the light control layer has a thickness of 3.0 μm-11.0 μm.

10. The light control sheet according to claim 3, wherein the light control layer has a thickness of 3.0 μm-11.0 μm.

11. The light control sheet according to claim 5, wherein the light control layer has a thickness of 3.0 μm-11.0 μm.

* * * * *